US008705467B2

(12) United States Patent
Korhonen et al.

(10) Patent No.: US 8,705,467 B2
(45) Date of Patent: Apr. 22, 2014

(54) CROSS-CARRIER PREAMBLE RESPONSES

(75) Inventors: Juha S. Korhonen, Espoo (FI); Antti S. Sorri, Helsinki (FI); Esa M. Malkamaki, Espoo (FI)

(73) Assignee: Nokia Corporation, Espoo (FI)

( * ) Notice: Subject to any disclaimer, the term of this patent is extended or adjusted under 35 U.S.C. 154(b) by 337 days.

(21) Appl. No.: 13/097,511

(22) Filed: Apr. 29, 2011

(65) Prior Publication Data

US 2012/0275390 A1  Nov. 1, 2012

(51) Int. Cl.
*H04W 4/00*  (2009.01)
(52) U.S. Cl.
USPC ............................. 370/329; 370/252; 370/328
(58) Field of Classification Search
None
See application file for complete search history.

(56) References Cited

U.S. PATENT DOCUMENTS

| 2009/0034452 | A1* | 2/2009 | Somasundaram et al. | ..... 370/328 |
| 2010/0238859 | A1* | 9/2010 | Vukovic et al. | ............... 370/328 |
| 2010/0296467 | A1* | 11/2010 | Pelletier et al. | ............... 370/329 |
| 2011/0045837 | A1* | 2/2011 | Kim et al. | ................... 455/452.1 |

FOREIGN PATENT DOCUMENTS

| EP | 2 288 220 A2 | 2/2011 |
| WO | WO 2010/0124228 A2 | 10/2010 |

OTHER PUBLICATIONS

3GPP TS 36.321 V10.1.0 (Mar. 2011), Technical Specification, 3$^{rd}$ Generation Partnership Project; Technical Specification Group Radio Access Network; Evolved Universal Terrestrial Radio Access (E-UTRA); Medium Access Control (MAC) Protocol Specification (Release 10), (57 pages).
"3$^{rd}$ Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.0.0, Dec. 2010, 53 pgs.
"3$^{rd}$ Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.0.0, Mar. 2011, 290 pgs.
"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.0.0, Jun. 2010, 183 pgs.

* cited by examiner

*Primary Examiner* — David Oveissi
(74) *Attorney, Agent, or Firm* — Harrington & Smith

(57) ABSTRACT

Methods, apparatus, and program products are disclosed that perform the following: sending an offset to a user equipment; sending an assignment on a control channel, the assignment corresponding to a random access request by the user equipment, wherein the assignment is addressed to the user equipment by using a value determined using the offset; and sending a random access response for the user equipment on resources of a shared channel, the resources corresponding to the assignment. Methods, apparatus, and program products are disclosed that perform the following: receiving at a user equipment an offset; receiving an assignment on a control channel, the assignment corresponding to a random access request, wherein the assignment is addressed to the user equipment by using a value determined using the offset; and receiving a random access response for the user equipment on resources of a shared channel, the resources corresponding to the assignment.

20 Claims, 5 Drawing Sheets

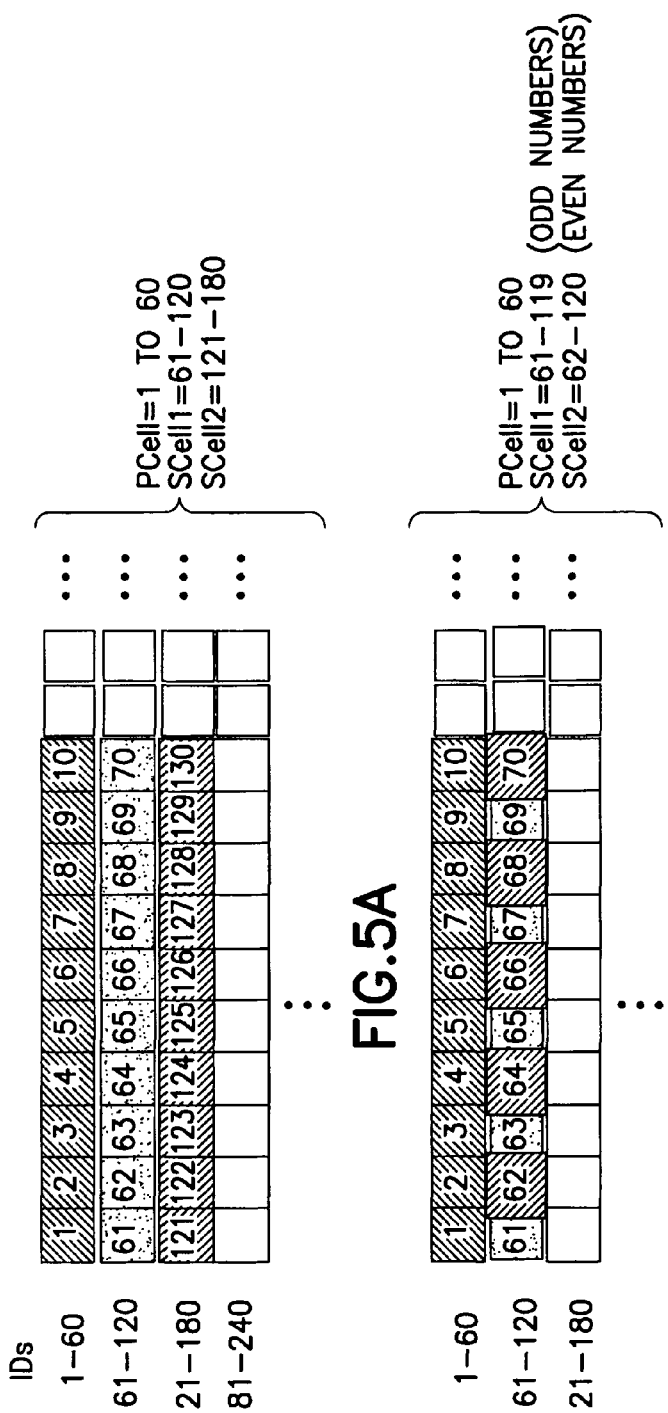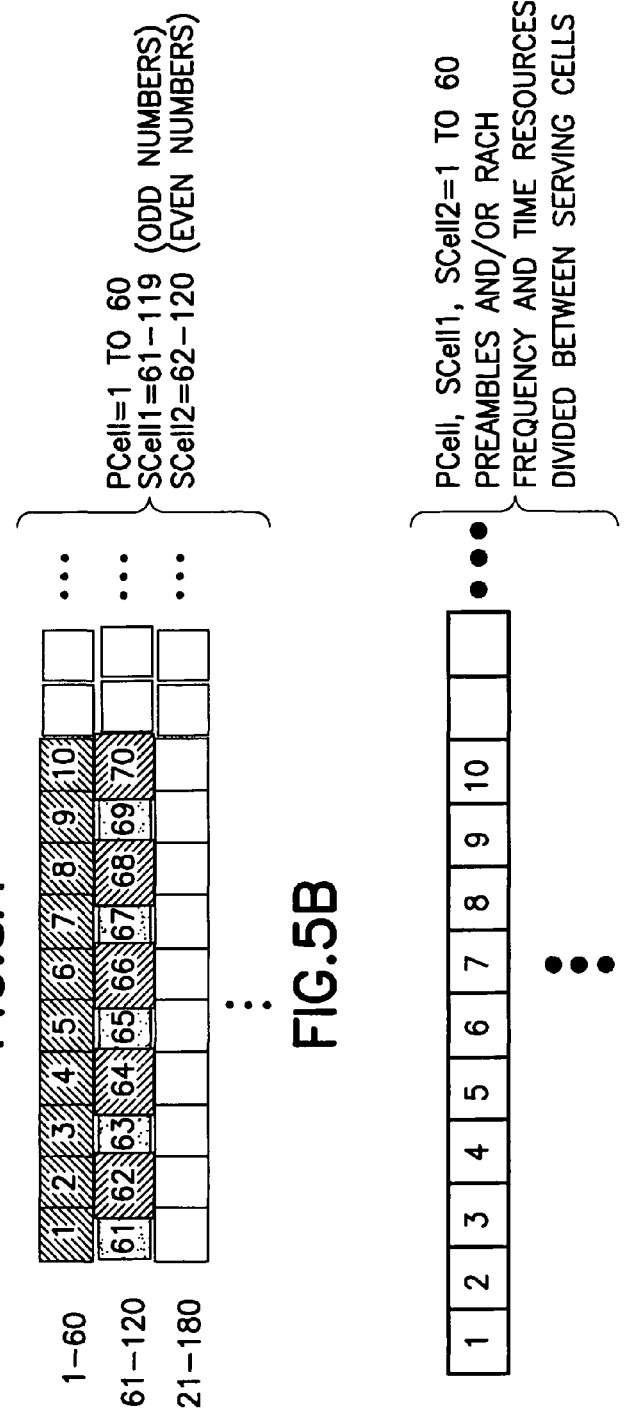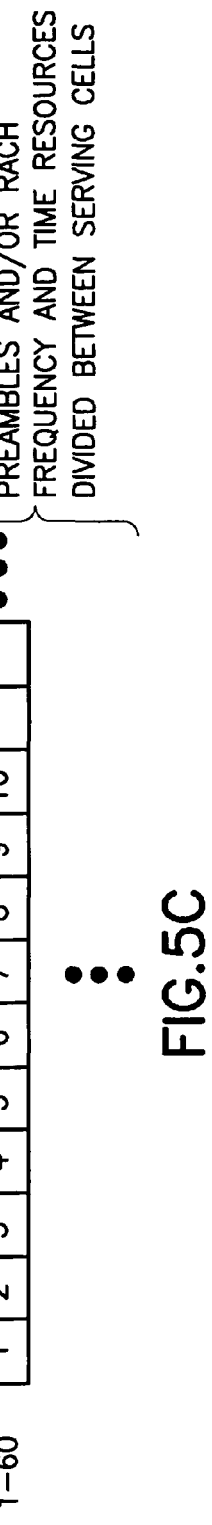

CROSS-CARRIER PREAMBLE RESPONSES

TECHNICAL FIELD

This invention relates generally to radio frequency communications and, more specifically, relates to random access channel signaling techniques between a user equipment and serving cells.

BACKGROUND

The following abbreviations that may be found in the specification and/or the drawing figures are defined as follows:
- 3GPP third generation partnership project
- CIF carrier indicator field
- DCI downlink control information
- DL downlink, from base station to user equipment
- eNB E-UTRAN Node B (evolved Node B)
- E-UTRAN evolved UTRAN (LTE)
- FDD frequency division duplex
- ID identification
- LTE long term evolution of UTRAN (E-UTRAN)
- PCell primary cell
- PDCCH physical downlink control channel
- PDSCH physical downlink shared channel
- PRACH physical random access channel
- Rel release (e.g., Rel-10 is release 10)
- RA-RNTI random access—radio network temporary identifier
- RAR random access response
- RRC radio resource control
- RH remote radio head
- SCell secondary cell
- TA timing advance
- TS technical standard
- TDD time division duplex
- UE user equipment, such as a mobile station, mobile node or mobile terminal
- UL uplink, from user equipment to base station
- UTRAN universal terrestrial radio access network In LTE, uplink transmissions of different UEs to a base station are time aligned within a cell and a given UE obtains certain timing information during a random access procedure with the base station. Certain problems can occur when a UE needs to adjust timing separately for more than one cell.

BRIEF SUMMARY

An exemplary method includes sending an offset to a user equipment, and sending an assignment on a control channel. The assignment corresponds to a random access request by the user equipment. The assignment is addressed to the user equipment by using a value determined using the offset. The method includes sending a random access response for the user equipment on one or more resources of a shared channel, the one or more resources corresponding to the assignment.

In another exemplary embodiment, a computer program product includes a computer-readable medium bearing computer program code embodied therein for use with a computer. The computer program code includes the following: code for sending an offset to a user equipment; code for sending an assignment on a control channel, the assignment corresponding to a random access request by the user equipment, wherein the assignment is addressed to the user equipment by using a value determined using the offset; and code for sending a random access response for the user equipment on one or more resources of a shared channel, the one or more resources corresponding to the assignment.

In a further exemplary embodiment, an apparatus includes the following: means for sending an offset to a user equipment; means for sending an assignment on a control channel, the assignment corresponding to a random access request by the user equipment, wherein the assignment is addressed to the user equipment by using a value determined using the offset; and means for sending a random access response for the user equipment on one or more resources of a shared channel, the one or more resources corresponding to the assignment.

In an additional exemplary embodiment, an apparatus includes one or more processors; and one or more memories including computer program code. The one or more memories and the computer program code are configured to, with the one or more processors, cause the apparatus to perform at least the following: sending an offset to a user equipment; sending an assignment on a control channel, the assignment corresponding to a random access request by the user equipment, wherein the assignment is addressed to the user equipment by using a value determined using the offset; and sending a random access response for the user equipment on one or more resources of a shared channel, the one or more resources corresponding to the assignment.

In a further exemplary embodiment, a method includes receiving, at a user equipment, an offset and receiving, at the user equipment, an assignment on a control channel. The assignment corresponds to a random access request by the user equipment, wherein the assignment is addressed to the user equipment by using a value determined using the offset. The method includes receiving a random access response for the user equipment on one or more resources of a shared channel, the one or more resources corresponding to the assignment.

In a further exemplary embodiment, a computer program product includes a computer-readable medium bearing computer program code embodied therein for use with a computer. The computer program code includes the following: code for receiving, at a user equipment, an offset; code for receiving, at the user equipment, an assignment on a control channel, the assignment corresponding to a random access request by the user equipment, wherein the assignment is addressed to the user equipment by using a value determined using the offset; and code for receiving a random access response for the user equipment on one or more resources of a shared channel, the one or more resources corresponding to the assignment.

In yet another exemplary embodiment, an apparatus includes the following: means for receiving an offset; means for receiving an assignment on a control channel, the assignment corresponding to a random access request by the apparatus, wherein the assignment is addressed to the apparatus by using a value determined using the offset; and means for receiving a random access response for the apparatus on one or more resources of a shared channel, the one or more resources corresponding to the assignment.

In another exemplary embodiment, an apparatus includes one or more processors; and one or more memories including computer program code. The one or more memories and the computer program code are configured to, with the one or more processors, cause the apparatus to perform at least the following: receiving an offset; receiving an assignment on a control channel, the assignment corresponding to a random access request by the apparatus, wherein the assignment is addressed to the apparatus by using a value determined using the offset; and receiving a random access response for the apparatus on one or more resources of a shared channel, the one or more resources corresponding to the assignment.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIGS. 5A, 5B, and 5C illustrate RA-RNTI reservations for three examples, each example using an FDD PCell and two FDD SCells.

DETAILED DESCRIPTION OF THE DRAWINGS

Figure 1:
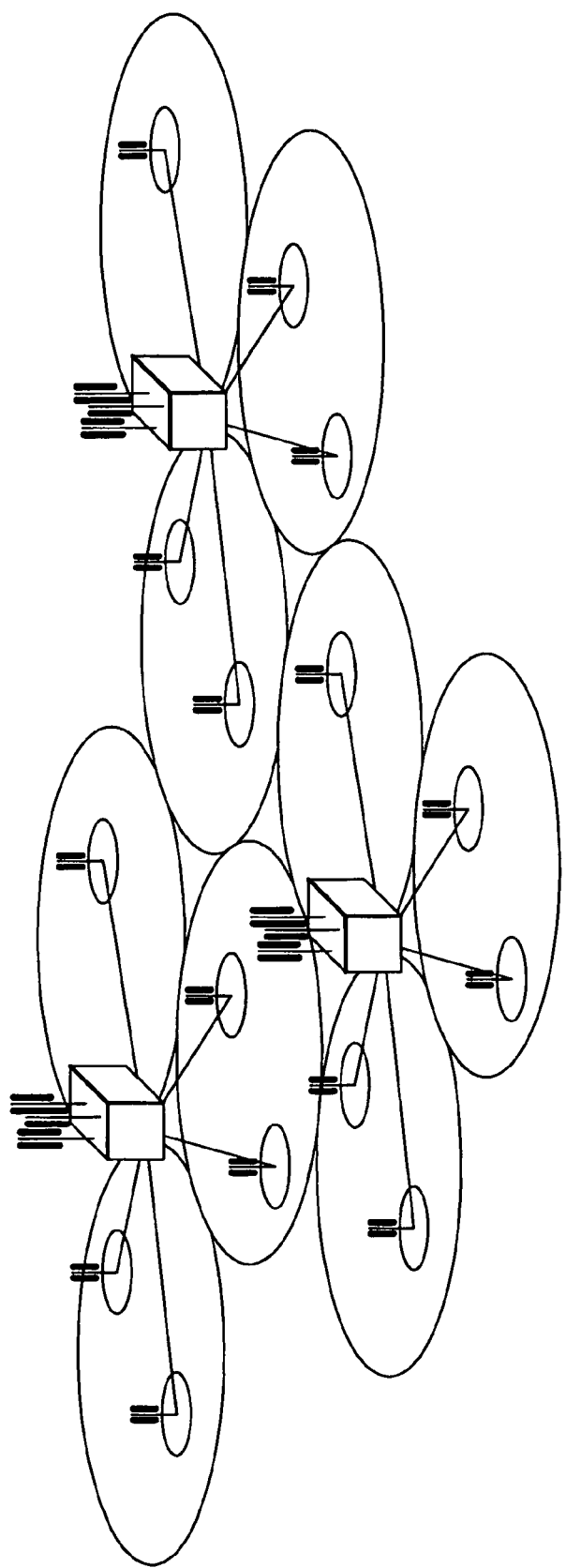
FIG. 1 is a deployment scenario where multiple timing advances (TAs) may be needed.

As explained above, in LTE, uplink transmissions of different UEs are time aligned. A UE obtains an initial timing advance (TA) value during a random access procedure, and an eNB sends subsequent TA commands when necessary. In the beginning of the random access procedure, the UE transmits a preamble in a physical random access channel (PRACH) and receives a preamble response (e.g., a RAR=random access response) that includes the initial timing advance value. Responses to many UEs may be multiplexed into a single response message that is sent in PDSCH. The PDSCH resource of the response message is assigned in the PDCCH with a random access—radio network temporary identifier (RA-RNTI). A mapping from a PRACH frequency and time resource to RA-RNTI tells which RA-RNTI the UE should use when searching for a response to its preamble (from 3GPP TS 36.321, V 10.0.0, chapter 5.1.4):

The RA-RNTI associated with the PRACH in which the Random Access Preamble is transmitted, is computed as:

$$RA\text{-}RNTI = 1 + t\_id + 10 * f\_id,$$

Where $t\_id$ is the index of the first subframe of the specified PRACH ($0 \leq t\_id < 10$), and $f\_id$ is the index of the specified PRACH within that subframe, in ascending order of frequency domain ($0 \leq f\_id < 6$). The particular reference to the first subframe of PRACH is needed because three of a total of five preamble formats extend to the second or third subframe. In an FDD system, there is at most one PRACH resource in a subframe ($f\_id=0$ always), while in TDD, there can be up to five PRACH resources in a subframe. Furthermore, the number of simultaneous TDD PRACH resources may depend on the subframe index.

The network (e.g., eNB 12) configures 64 preamble sequences for each cell, and the sequences are identified with a ra-PreambleIndex that can have values from 0 to 63. The preamble sequences of a cell are divided into two groups. The first group contains preambles for UE selection during the contention-based random access while the second group is reserved for network initiated non-contention based random access. During contention based random access, collisions happen when UEs transmit the same preamble sequence in the same PRACH resource, i.e., ra-PreambleIndex, t_id, and f_id are equal for at least two preambles. When the network initiates random access, the network may choose to utilize the non-contention based procedure. By signaling a ra-PreambleIndex, the network orders a UE to use only a particular preamble sequence and by signaling ra-PRACH-MaskIndex, the network can furthermore indicate a PRACH resource or resource group where preamble transmission is allowed for this UE. This way, the network can avoid preamble collisions. In both contention and non-contention based procedures, the preamble responses have the same format containing among other things the ra-PreambleIndex of the observed preamble. The responses of both contention and non-contention preambles can be multiplexed in the same PDSCH message.

Rel-10 of LTE specifies carrier aggregation (CA), a concept of component carriers corresponding to multiple serving cells. Besides a primary component carrier, corresponding to a primary cell (PCell), one or more secondary component carriers, corresponding to secondary cells (SCells), may be configured for a UE. A primary cell is a cell, operating on a primary frequency, in which the UE either performs the initial connection establishment procedure or initiates the connection re-establishment procedure, or the cell indicated as the primary cell in the handover procedure. A secondary cell is a cell, operating on a secondary frequency, which may be configured once an RRC connection is established and which may be used to provide additional radio resources to the UE. The term "serving cells" is used to denote the set of cells including the primary cell and all secondary cells. A single serving cell is one of the serving cells. See, e.g., 3GPP TS 36.331 V10.1.0 (2011-03). An assumption of Rel-10 is that PCell and SCell share the same timing advance value. The UE uses RACH only in the PCell and the whole random access procedure, whether contention or non-contention based, is handled through PCell.

The PCell always carries PDCCH, but SCells may be configured without PDCCH. If an SCell has been configured with PDCCH, the cell is scheduled through that PDCCH. However, if the SCell is configured without PDCCH, cross carrier scheduling applies. That is, the cell is scheduled through a PDCCH of another serving cell (PCell or SCell). Carrier indicator fields (CIFs) are included in downlink control information (DCI) formats for indicating which cell the UL grant or DL assignment is meant for. A constraint is that UE needs to search only DCI formats without CIF from the common search space of PDCCH. The assignment for random access responses is sent in the common search space of PDCCH with RA-RNTI.

An objective of a Rel-11 carrier aggregation work item is to specify support for multiple TA in case of uplink carrier aggregation. A scenario where multiple TA is important is shown in FIG. 1. The figure in FIG. 1 is similar to a figure in 3GPP TS 36.300 V.10.0.0, appendix J1, deployment scenario 4. Small cells (small ovals; the small cells are called "hotspots" herein) are provided with and formed by, e.g., remote radio heads inside the coverage area of macro cells (large ovals). Each macro cell is typically created by a single base station. At the center of three macro cells is a cell tower. A PCell for a UE is a macro cell and an SCell is formed around a remote radio head (RRH) (or vice versa: the PCell is a RRH and the SCell is a macro cell, although this is not typical). Another example of a multiple timing advance use case is when one of the cells is transmitted using a spectrum that is amplified by a repeater. Uplink timings may have to be controlled separately, and the initial timing advance may have to be obtained separately for both cells (e.g., PCell and SCell) by random access. In a more general form, different cells can be arranged in TA groups such that cells belonging to the same group share the TA.

Figure 2:
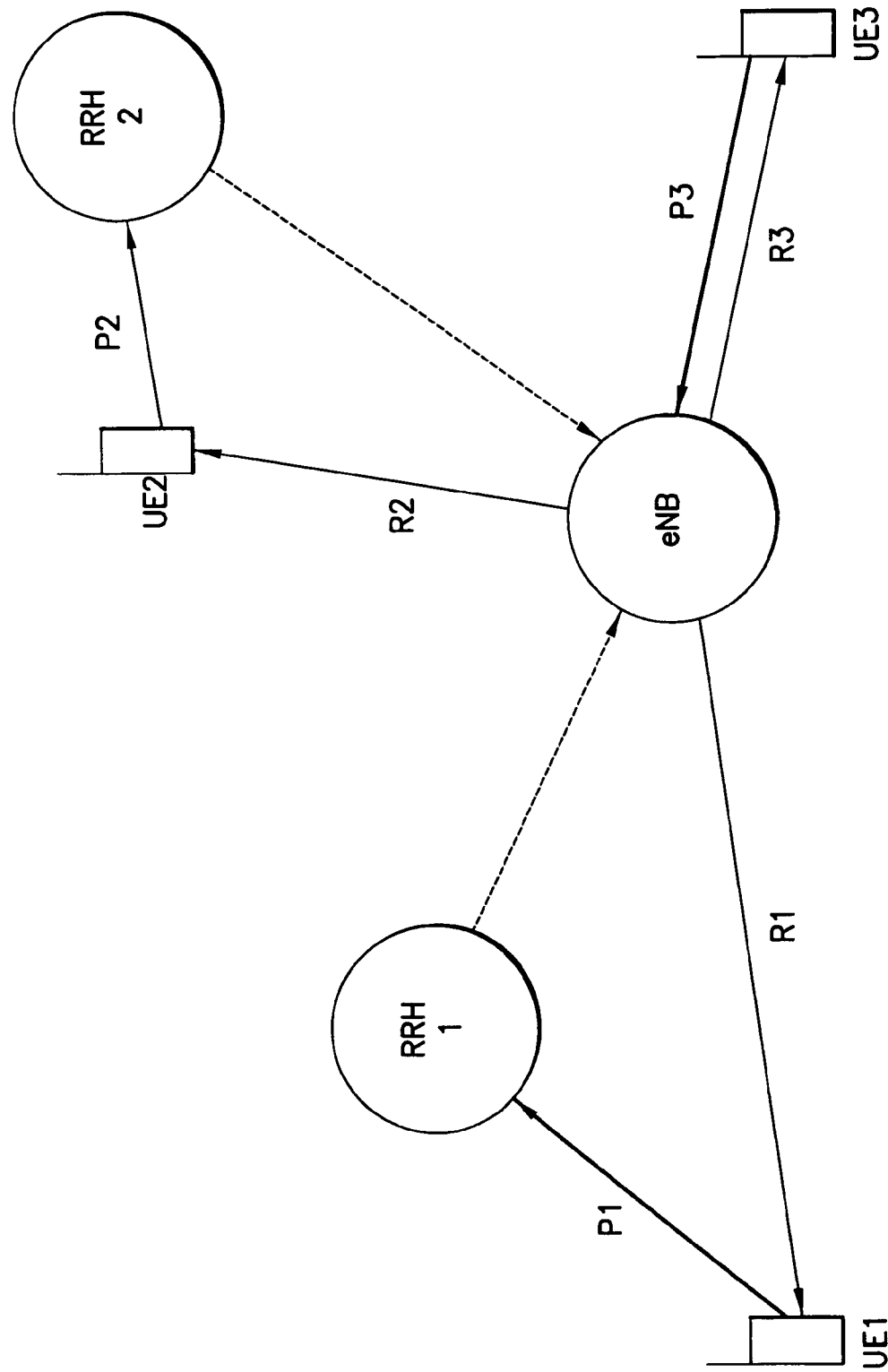
FIG. 2 shows preambles (P1, P2, and P3), preamble responses (R1, R2, and R3), and signaling between three UEs (UEs 1, 2, 3), remote radio heads (RRHs) and eNB (dashed lines) with cross-carrier scheduling.

One problem appears if SCell does not have PDCCH, i.e., cross carrier scheduling is in use. The present random access procedure is performed completely in one cell, and thus does not cover responding in the PCell to preambles that are sent in the SCell. In the scenario of FIG. 1, this would mean that the UE would send a preamble in PRACH of a RRH and would need to receive a preamble response through the macro base station. See FIG. 2, which shows preambles (P1, P2, and P3), preamble responses (R1, R2, and R3), and corresponding signaling between three UEs (UEs 1, 2, 3), two remote radio heads (RRHs 1 and 2), and an eNB with cross carrier scheduling. The RRHs 1 and 2 forward the preambles to the eNB. In other words, UEs 1 and 2 send preambles in PRACH of the RRHs 1 and 2, respectively, but receive responses R1 and R2 from the eNB. It is noted that the RRH 1 (SCell) and eNB (PCell) are serving cells for UE 1, RRH 2 (SCell) and the eNB (PCell) are serving cells for UE 2, and the eNB is a serving cell for UE 3.

Considered here are mainly non-contention based random accesses, because that seems sufficient for adjusting timing of SCells, however, the invention presented here is applicable to contention based random access, too. As explained earlier, in non-contention based random access, the UE receives an order to transmit dedicated preamble sequences in certain PRACH time-frequency resource or resources. The order is sent in PDCCH and it contains a ra-PreambleIndex and a ra-PRACH-MaskIndex.

A problem is to define preamble responding that allows efficient use of PRACH resources, preamble sequences and PDCCH resources, reusing as much as possible the Rel-10 definitions. When the macro eNB sends random access responses (RAR) for preambles transmitted in several serving cells, the UE does not know which RARs belong to PCell and which to (various) SCells if Rel-10 definitions were applied as such.

There are some techniques for removing this problem. The first technique is to abandon cross-carrier scheduling in order to be able to send preamble responses also through SCell. The second technique is to perform the initial timing adjustment of SCell without random access: the UE sets the initial timing based on the TA value of the PCell, and the (UE) observed timing difference of PCell and SCell. Neither of these is a likely solution. First, cross-carrier scheduling is an important feature that cannot be removed because of a complication due to the random access. Second, a RACH-less initial timing determination would require specification of a completely new procedure and conformance test.

Another straightforward technique to solve this problem would be to include a carrier indication field (CIF) in that downlink control information (DCI) format of PDCCH that is used for assigning resources for random access responses. However, the assignments for random access responses must be sent in the search space that is common to all UEs. In Rel-10, all common space DCI formats are without CIF, which means that handling the problem by adding CIF would be a major change in the standard and UE implementation because the number of blind decodings on PDCCH would increase.

Yet another technique to solve this problem would be to modify the RAR format by including cell indication field in the RARs of the preambles observed in another cell. Introducing another RAR format can be considered as a significant change of the specification because it is not straightforward to multiplex RARs of the new and old format in the same message in a manner that would be compatible with UEs of earlier releases.

Figure 3:
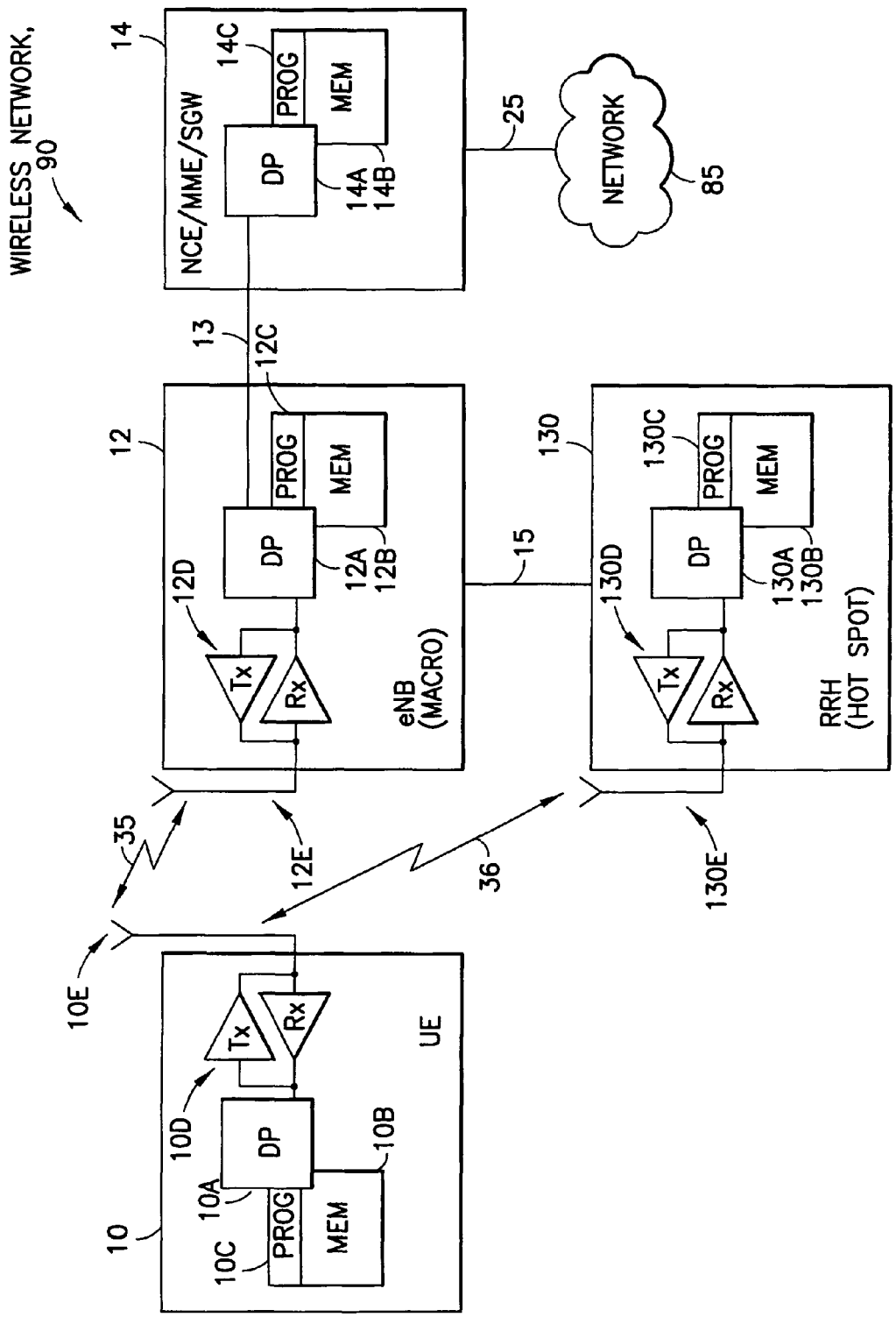
FIG. 3 is a simplified block diagram of various exemplary apparatus that are suitable for use in practicing the exemplary embodiments of this invention.

Before describing in further detail the exemplary embodiments of this invention, reference is made to FIG. 3 for illustrating a simplified block diagram of various apparatus that are suitable for use in practicing the exemplary embodiments of this invention. In FIG. 3, a wireless network 90 includes an eNB 12, an NCE/MME/SGW 14, and a RRH 130 (in this example, generating a hotspot as shown in FIG. 1). The wireless network 90 is adapted for communication over a wireless link 35 with an apparatus, such as a mobile communication device which may be referred to as a UE 10, via a network access node, such as a Node B (base station), and more specifically an eNB 12. The network 90 may include a network control element (NCE) 14 that may include MME/SGW functionality, and which provides connectivity with a further network, such as a telephone network and/or a data communications network 85 (e.g., the internet) through link 25. The NCE 14 includes a controller, such as at least one computer or a data processor (DP) 14A, and at least one non-transitory computer-readable memory medium embodied as a memory (MEM) 14B that stores a program of computer instructions (PROG) 10C.

The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transceiver 10D for bidirectional wireless communications with the eNB 12 via one or more antennas 10E. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas 12E (typically several when multiple input, multiple output (MIMO) operation is in use). The eNB 12 is coupled via a data and control path 13 to the NCE 14. The path 13 may be implemented as an S1 interface. The eNB 12 may also be coupled to another eNB via data and control path 15, which may be implemented as an X2 interface. In the example of FIG. 3, a RRH 130 is also accessed by the data and control path 15. Typically, the eNB 12 covers a single macro cell via the one or more antennas mounted on the cell tower.

In this example, the RRH 130 includes a controller, such as at least one computer or a data processor (DP) 130A, at least one computer-readable memory medium embodied as a memory (MEM) 130B that stores a program of computer instructions (PROG) 130C, and at least one suitable RF transceiver 130D for communication with the UE 10 via one or more antennas 130E (as stated above, typically several when multiple input, multiple output (MIMO) operation is in use). The RRH 130 communicates with the UE 10 via a link 36. It should be noted that typically a RRH only contains the antenna(s) and RF circuitry and the rest of processing is carried out in the eNB. Thus DP, PROG and MEM in RRH case may reside in the eNB as well as parts of Tx circuitry and Rx circuitry.

At least one of the PROGs 10C, 12C, and 130C is assumed to include program instructions that, when executed by the associated DP, enable the corresponding apparatus to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, and/or by the DP 130A of the RRH 130, or by hardware (e.g., an integrated circuit configured to perform one or more of the operations described herein), or by a combination of software and hardware (and firmware).

In general, the various embodiments of the UE 10 can include, but are not limited to, cellular telephones, tablets having wireless capability, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B, 12B, and 130B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A, 12A, and 130A may be of any type suitable to the local technical environment, and may include one or more of general purpose computers, special purpose computers, microprocessors, digital signal processors (DSPs) and processors based on multi-core processor architectures, as non-limiting examples.

In an exemplary embodiment, a RA-RNTI offset is defined for the mapping from PRACH resource(s) to the RA-RNTI:

$$RA\text{-}RNTI = 1 + t\_id + 10 * f\_id + RA\text{-}RNTI\text{-}offset,$$

where t_id is the index of the first subframe of the specified PRACH (as defined for Rel-10), f_id is the index of the specified PRACH with that subframe (as defined for Rel-10) and the offset RA-RNTI-offset is signaled to the UE through PDCCH (e.g., dynamic offset), when the non-contention based random access procedure is initiated by the eNB, or through RRC signaling (e.g., semi-static offset), when a SCell is configured for the UE, or through broadcasted system information (e.g., cell specific offset). The offset separates responses to preambles that are transmitted in different cells. In principle, the offset could also be signaled through MAC signaling, e.g., with activation MAC CE, although this is a less likely solution. Furthermore, the offset could also be signaled via system information of SCell, that would, however, mean that UE should read system information also from the SCell which currently is not required and that would also mean that all UEs in that cell would have the same offset (which is not required when dedicated (UE specific) RRC signaling is used).

In order to limit the number of signaling bits, a format of RA-RNTI-offset=N*60 may be used, where the parameter N may have integer values from 0 to, e.g., 15. The factor 60 comes from the ranges t_id=0 . . . 9 and f_id=0 . . . 5. That is, 60=1+the maximum value for t_id+10* (the maximum value for f_id). Because f_id is always zero in LTE FDD, RA-RNTI-offset=N*10 could be selected there, as well. In these cases, N would be typically signaled (either via RRC signaling or via PDCCH).

The offset RA-RNTI-offset allows flexible multiplexing of preamble responses. In one example at one extreme, PDCCH resource saving may be desired. In this example, the eNB sets the RA-RNTI-offset always to zero, which means that eNB may collect, for the same PDSCH message, responses to preambles that have been observed with the same t_id and f_id in any of the cells whose RARs are sent through the eNB. In this case, the eNB must take care that two UEs cannot transmit the same preamble with the same ra-PreambleIndex, t_id and f_id, which means that preambles (or more exactly the ra-PreambleIndexes) and RACH frequency and time resources are divided between all the cells, reducing the RACH capacity per cell. In another example at the other extreme, all RA-RNTI-offsets of all cells are different and RA-RNTIs of the different cells are never overlapping. Then, response messages will be transmitted separately for each cell but full RACH capacity is available in every cell.

The problems described previously can be solved also without the offset (as indicated above by setting the offset to zero). Then, random access resources (PRACHs) have to be configured such that PCell and SCells use different resources and thus RARs will be sent using different RA-RNTIs for each serving cell. This solution, however, requires setting quite a few limitations on PRACH resources. That is, PRACH resources would be divided between the cells, leading to fewer PRACH resources per cell. Another way is to divide the preamble space between the serving cells (that is, the preambles being used are divided between each serving cell for the use of the individual serving cells). As described above, these alternatives are covered by setting the offset to zero. Regardless, more coordination between cells is necessary when the offset is zero. This is illustrated by FIG. 5C, the RA-RNTI reservations in case of an FDD PCell (e.g., macro eNB) and two FDD SCells (e.g., RRHs) for the case where RA-RNTI-offset is zero and each serving cell shares RA-RNTIs from 1 to 60 (or 10).

Figure 4:
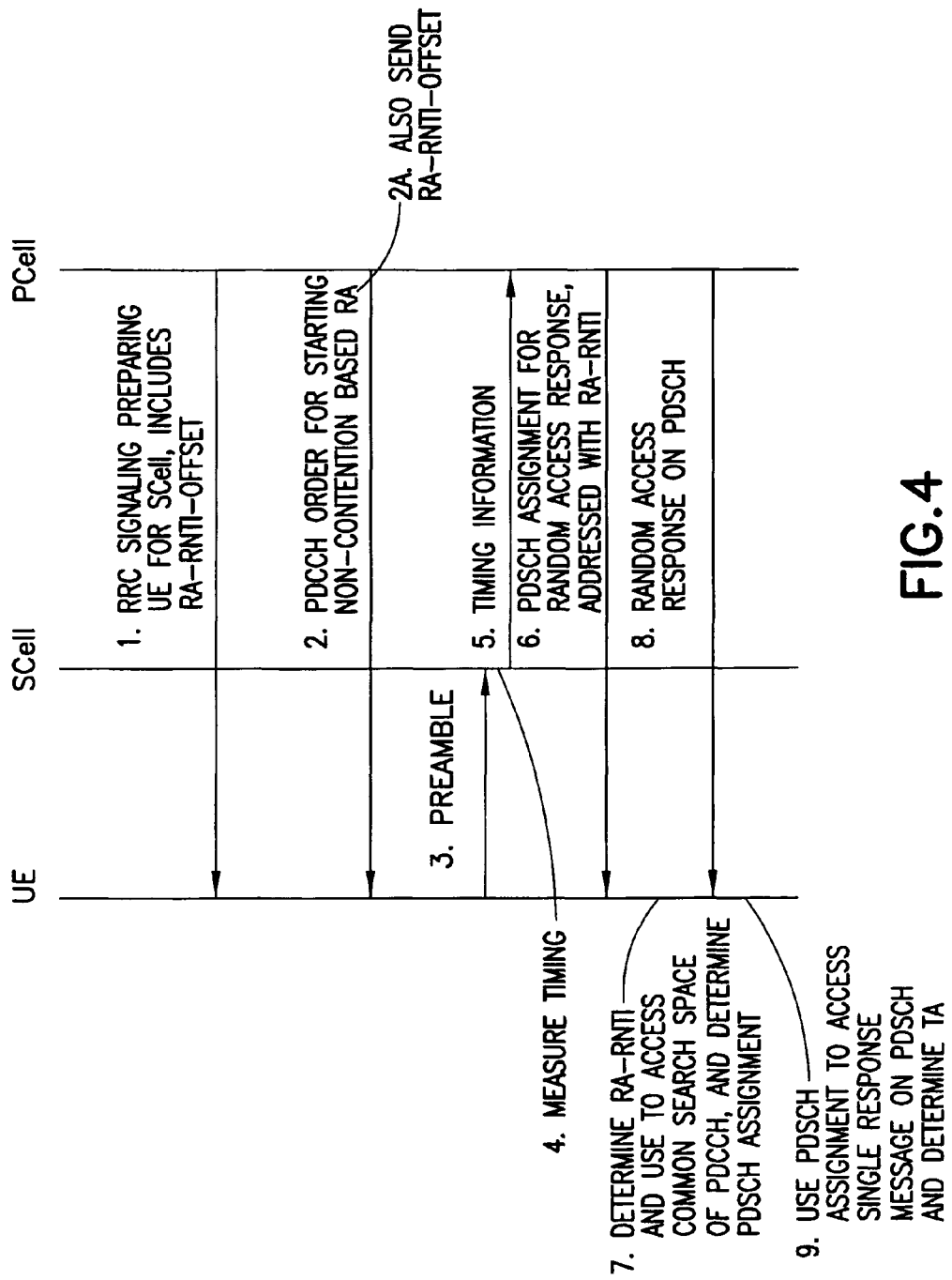
FIG. 4 is a signaling diagram for setting RA-RNTI-offset through RRC signaling and a non-contention based RA procedure.

FIG. 4 shows a possible signaling diagram for the semi-static offset alternative. First, an RRC reconfiguration message (message 1) adding an SCell configuration for a UE is sent from the PCell (e.g., a macro eNB) to the UE. That message configures the UE to use also the SCell (e.g., a RRH) and the message contains an indication of the RA-RNTI-offset. The message can also inform the UE as to where the random access resources (PRACH) are in the SCell. For FDD, there is only one PRACH per subframe, f_id=0, and for TDD there can be more PRACHs per UL subframe. For FDD, it is enough to inform a UE the subframes where PRACH are, for TDD also the frequency needs to be informed. For carrier aggregation, SCell configuration is sent using dedicated RRC signaling (e.g., no need to read system information (SI)). It is also assumed that also PRACH resources will be signaled using dedicated RRC signaling. After configuration of the SCell, the SCell has to be activated before it can be used. Activation is done with activation/deactivation MAC control element sent in a MAC PDU (not shown in the figure). In principle, it could be possible to determine the TA also before activation, therefore, the activation is not shown in the figure. To measure the timing to the SCell, the PCell sends (message 2) a PDCCH order (with a OF indicating the SCell) asking the UE to send a dedicated preamble to SCell using the SCell-configured PRACH resources. The ra-PreambleIndex is also given in the PDCCH order. The UE sends (message 3) the preamble to the SCell, and the SCell measures the timing (step 4) and passes timing information to the PCell (message 5). The PCell sends (message 6) a DL assignment for RAR on the PDCCH in the common search space using the SCell RA-RNTI (e.g., already incremented with the configured RA-RNTI-offset as described above) to the UE. The UE uses (step 7) the RA-RNTI to decode the DCI sent in the common search space of the PDCCH and to determine the PDSCH assignment. In message 8, the PCell sends the RAR containing the TA for the SCell to the UE. In step 9, the UE uses the PDSCH assignment to access the response message on the PDSCH and reads the TA corresponding to the SCell.

It is noted that the exemplary embodiments of the instant invention are more about signaling of preamble responses for multiple component carriers and not necessarily about different TAs. However, SCell1 and SCell2 could be part of one TA group, and thus use the same TA, but the TA could be measured via SCell1 or SCell2. Then it can be beneficial to have separate offsets for both SCells so that it is possible to indicate in preamble responses which cell corresponds to the preamble response.

Alternatively, the RA-RNTI-offset could be sent together with the PDCCH order (e.g., a dynamic offset alternative) in message 2 (as indicated by message 2A) The previous description of the semi-static offset alternative is labeled "semi-static" because the RRC configuration in message 1 causes a configuration that typically lasts longer than a configuration caused by the PDCCH order sent in message 2. That is, the offset stays the same unless changed by other RRC signaling. In other words, there can be multiple PDCCH orders sent in multiple messages 2 for a single RRC configuration message sent in message 1. Thus, the dynamic offset alternative can typically change the offset more often than can the semi-static offset alternative. The dynamic offset alternative therefore allows faster control of the offset because no RRC reconfiguration message is needed for changing the offset. The dynamic and semi-static RA-RNTI-offset signaling methods allow UE specific offsets. Besides these alternatives, RA-RNTI-offsets could be included in the system information broadcasted for a Scell, therefore being always cell specific. A present assumption is that the UE does not need to read the system information of SCell but this could change in the future.

FIGS. 5A and 5B show two exemplary RA-RNTI reservations in case of an FDD PCell (e.g., macro eNB) and two FDD SCells (e.g., RRHs). It has been assumed that RA-RNTI offset may have values N*60, the possible values of N being, e.g., 0, 1, . . . , 15. In FIG. 5A, different RA-RNTI offsets are given for UEs in the two SCells, while in FIG. 5B, the RA-RNTI offsets for the two SCells are the same. In FIG. 5A, more RACH capacity is available in the SCells relative to what occurs in FIG. 5B, because the PRACH time resources are divided between the serving cells. Meanwhile, in FIG. 5B, preambles for different SCells are transmitted in different PRACH subframes. For FDD, RA-RNTI-offsets could be as well N*10 with N=0, 1, . . . , 15 but N*60 can be considered simpler because it would be suitable for both FDD and TDD systems. The same approach would work also in the future if FDD and TDD carrier aggregation is standardized. That is, FIGS. 5A and 5B are clearly directed to FDD cells because the figures do not show gaps in reserved RA-RNTIs corresponding to DL subframes. Another difference between FDD and TDD is that (according to present specification) f_id=0 in FDD, while in TDD values from zero to five are possible. However, in principle, the offset solves the above-described problems in a similar way whether there are only FDD cells, only TDD cells, or a mixture of the two.

The exemplary embodiments of the instant invention allow flexible tradeoffs between maximizing random access capacity and minimizing of PDCCH load. Standardization and implementation of the invented techniques should be simple. Standards changes should be used for taking into account PRACH for SCells and different TA groups. The additional changes due to adding an RA-RNTI-offset should be easily implemented. These techniques should be completely transparent to Rel-8, Rel-9, or Rel-10 UEs.

Because more IDs are reserved for RA-RNTIs, the number of IDs available for other RNTIs such as C-RNTIs is slightly reduced. However, this will seldom become a real problem, since the number of reserved RA-RNTIs per cell is limited. Providing the maximum RACH capacity reserves only 10 IDs per cell in FDD and six IDs per cell in TDD, and the total number of IDs is $2^{16}$=65,536 (i.e., 0000H to FFFFH, where H is hexadecimal).

In addition to the above exemplary embodiment, where it was proposed to use the offset to distinguish SCells from PCells (i.e., UEs sending preambles in SCell from UEs sending preambles in PCell), in another exemplary embodiment, the offset could be used even within one cell for different UEs. For instance, older release UEs would not use the offset whereas new UEs (e.g., Rel-11) would use an offset.

The new RAR could, e.g., signal several TAs for one UE (e.g., for PCell and SCell at the same time, this would be related to carrier aggregation) or the UL grant sent as part of RAR could be different for later release UEs. Additionally, there could be a need for some new parameter which then would change the format of RAR.

For this purpose (to distinguish different release UEs in RAR), the offset could be signaled in system information (e.g., in the extension part that is only read by new release UEs).

Without in any way limiting the scope, interpretation, or application of the claims appearing below, a technical effect of one or more of the example embodiments disclosed herein is to provide flexible cross carrier preamble responses for serving cells for a UE. Another technical effect of one or more of the example embodiments disclosed herein is to allow a UE to determine which TA corresponds to which one of a number of serving cells.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 3. A computer-readable medium may comprise a computer-readable storage medium (e.g., device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims

What is claimed is:

1. An apparatus, comprising:
one or more processors; and
one or more memories including computer program code,
the one or more memories and the computer program code configured to, with the one or more processors, cause the apparatus to perform at least the following:
sending from a first cell an offset regarding a random access radio network temporary identifier to a user equipment, where the offset regarding the random access radio network temporary identifier is specific to a second cell;
sending an assignment for random access responses on a control channel, the assignment corresponding to a random access request by the user equipment, wherein the assignment is addressed to the user equipment by using a value determined using the offset; and
sending a random access response for the user equipment on one or more resources of a shared channel, the one or more resources corresponding to the assignment.

2. The apparatus of claim 1, wherein:
the user equipment is served by a set of serving cells including the first cell and the second cell; and
sending the assignment further comprises sending the assignment on a control channel from the first cell in response to the random access request being sent to the second cell.

3. The apparatus of claim 2, wherein:
sending the random access response is performed by the first cell.

4. The apparatus of claim 1, wherein sending an offset further comprises sending the offset in system information to the user equipment.

5. The apparatus of claim 1, wherein sending an offset further comprises sending the offset in a radio resource control message to the user equipment.

6. The apparatus of claim 1, wherein sending an offset further comprises sending the offset in a physical downlink control channel order message to the user equipment, and wherein the control channel is the physical downlink control channel.

7. The apparatus of any one of claim 1, wherein the value determined using the offset is determined by the following for the user equipment:

$$\text{value}=1+t\_id+10*f\_id+\text{RA-RNTI-offset},$$

where t_id is an index of a first subframe of a specified random access channel used by the user equipment to transmit the preamble transmission to the serving cell, f_id is an index of a specified random access channel resource within the first subframe, RA-RNTI-offset corresponds to the offset.

8. The apparatus of claim 1, wherein the offset regarding the random access radio network temporary identifier is an offset multiplied by a predetermined constant.

9. The apparatus of claim 1, wherein:
the user equipment is served by a set of serving cells including the first cell and the second cell; and
a random access radio network temporary identifier for the first cell and a random access radio network identifier for the second cell are non-overlapping.

10. A method, comprising:
receiving from a first cell, at a user equipment, an offset regarding a random access radio network temporary identifier, where the offset regarding the random access radio network temporary identifier is specific to a second cell;
receiving, at the user equipment, an assignment on a control channel, the assignment corresponding to a random access request by the user equipment, wherein the assignment is addressed to the user equipment by using a value determined using the offset; and
receiving a random access response for the user equipment on one or more resources of a shared channel, the one or more resources corresponding to the assignment.

11. The method of claim 10, wherein:
the user equipment is served by a set of serving cells including the first cell and the second cell; and
receiving the assignment further comprises receiving the assignment on a control channel from the first cell in response to a random access request being sent by the user equipment to the second cell.

12. An apparatus, comprising:
one or more processors; and
one or more memories including computer program code,
the one or more memories and the computer program code configured to, with the one or more processors, cause the apparatus to perform at least the following:
receiving from a first cell an offset regarding a random access radio network temporary identifier, where the offset regarding the random access radio network temporary identifier is specific to a second cell;
receiving an assignment for random access responses on a control channel, the assignment corresponding to a random access request by the apparatus, wherein the assignment is addressed to the apparatus by using a value determined using the offset; and
receiving a random access response for the apparatus on one or more resources of a shared channel, the one or more resources corresponding to the assignment.

13. The apparatus of claim 12, wherein:
the apparatus is served by a set of serving cells including the first cell and the second cell; and
receiving the assignment further comprises receiving the assignment on a control channel from the first cell in response to a random access request being sent by the apparatus to the second cell.

14. The apparatus of claim 13, wherein the random access response is received from a transmission by the first cell of the one or more resources of the shared channel.

15. The apparatus of claim 12, wherein receiving an offset further comprises receiving the offset in system information.

16. The apparatus of claim 12, wherein receiving an offset further comprises receiving the offset in a radio resource control message.

17. The apparatus of claim 12, wherein receiving an offset further comprises receiving the offset in a physical downlink control channel order message, and wherein the control channel is the physical downlink control channel.

18. The apparatus of any one of claim 12, wherein the value determined using a corresponding offset is determined by the following for the selected serving cell:

$$\text{value}=1+t\_id+10*f\_id+\text{RA-RNTI-offset},$$

where t_id is an index of a first subframe of a specified random access channel used by the apparatus to transmit the preamble transmission to the selected serving cell, f_id is an index of a specified random access channel resource within the first subframe, and RA-RNTI-offset corresponds to the offset.

19. The apparatus of claim 12, wherein the offset regarding the random access radio network temporary identifier is an offset multiplied by a predetermined constant.

20. The apparatus of claim 12, wherein:
the apparatus is served by a set of serving cells including the first cell and the second cell; and
a random access radio network temporary identifier for the first cell and a random access radio network identifier for the second cell are non-overlapping.

\* \* \* \* \*